United States Patent [19]

Schilling

[11] Patent Number: 5,174,525
[45] Date of Patent: Dec. 29, 1992

[54] STRUCTURE FOR ELIMINATING LIFT LOAD BENDING IN ENGINE CORE OF TURBOFAN

[75] Inventor: Jan C. Schilling, Middletown, Ohio

[73] Assignee: General Electric Company, Cincinnati, Ohio

[21] Appl. No.: 765,804

[22] Filed: Sep. 26, 1991

[51] Int. Cl.⁵ .......................................... B64D 27/00
[52] U.S. Cl. .................................. 244/54; 248/554; 60/39.31
[58] Field of Search ............... 244/54; 248/554, 555, 248/557; 60/39.31

[56] References Cited

U.S. PATENT DOCUMENTS

| | | | |
|---|---|---|---|
| 2,978,209 | 4/1961 | Kerry | 244/54 |
| 3,318,554 | 5/1967 | Ward et al. | 244/54 |
| 3,750,983 | 8/1973 | Morris | 244/54 |
| 3,844,115 | 10/1974 | Freid | 60/39.31 |
| 4,013,246 | 3/1977 | Nightingale | 244/54 |
| 4,037,809 | 7/1977 | Legrand | 244/54 |
| 4,044,973 | 8/1977 | Moorehead | 244/54 |
| 4,266,741 | 5/1981 | Murphy | 244/54 |
| 4,326,682 | 4/1982 | Nightingale | 244/54 |
| 4,361,296 | 11/1982 | Hall et al. | 244/54 |
| 4,458,863 | 7/1984 | Smith | 244/54 |
| 4,471,609 | 9/1984 | Porter et al. | 60/39.31 |
| 4,560,122 | 12/1985 | Parkinson et al. | 244/54 |
| 4,603,821 | 8/1986 | White | 244/54 |
| 4,683,717 | 8/1987 | Naud | 60/226.1 |
| 4,742,975 | 8/1987 | Pachomoff et al. | 244/54 |
| 4,766,723 | 8/1987 | Newton | 60/39.31 |
| 4,854,525 | 8/1989 | Chee | 244/54 |
| 4,940,196 | 7/1990 | Lardellier | 244/54 |

Primary Examiner—Joseph F. Peters, Jr.
Assistant Examiner—Anne E. Bidwell
Attorney, Agent, or Firm—Jerome C. Squillaro

[57] ABSTRACT

A structure for removing bending caused by an inlet lift load in the engine core of an aircraft having a support frame which is attached to a frame mount which connects to the pylon floor. The frame mount is located between a forward mount and a rear mount and to the front of the engine core. As a result of the frame mount, the moment created by the inlet lift load is not reacted through the engine core so engine performance is not affected.

7 Claims, 5 Drawing Sheets

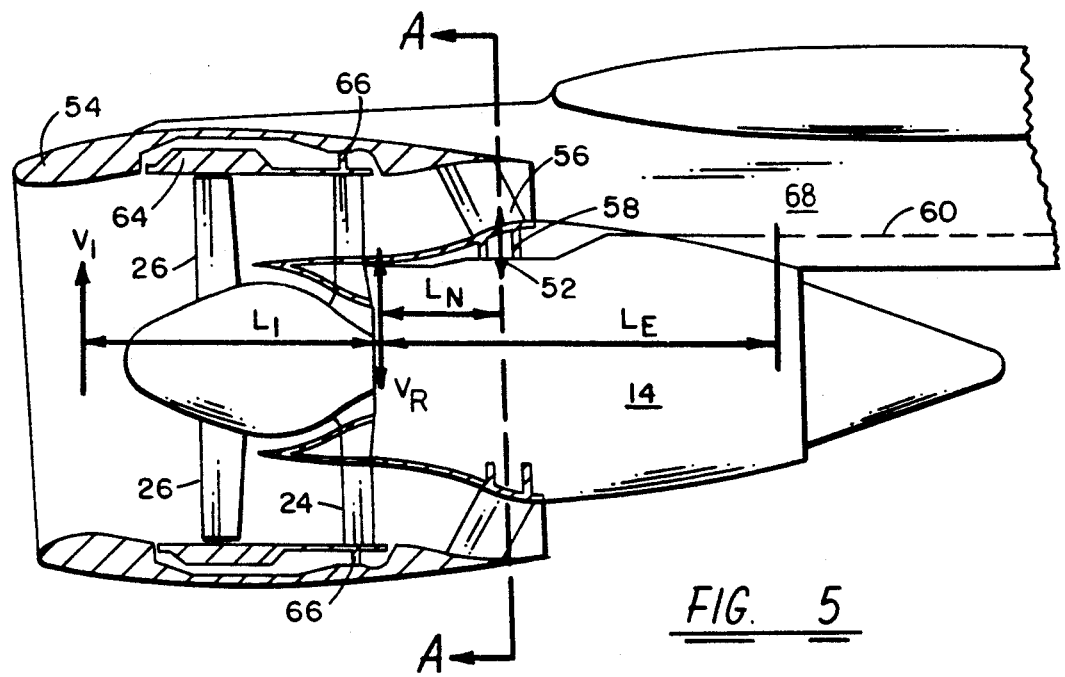
FIG. 5
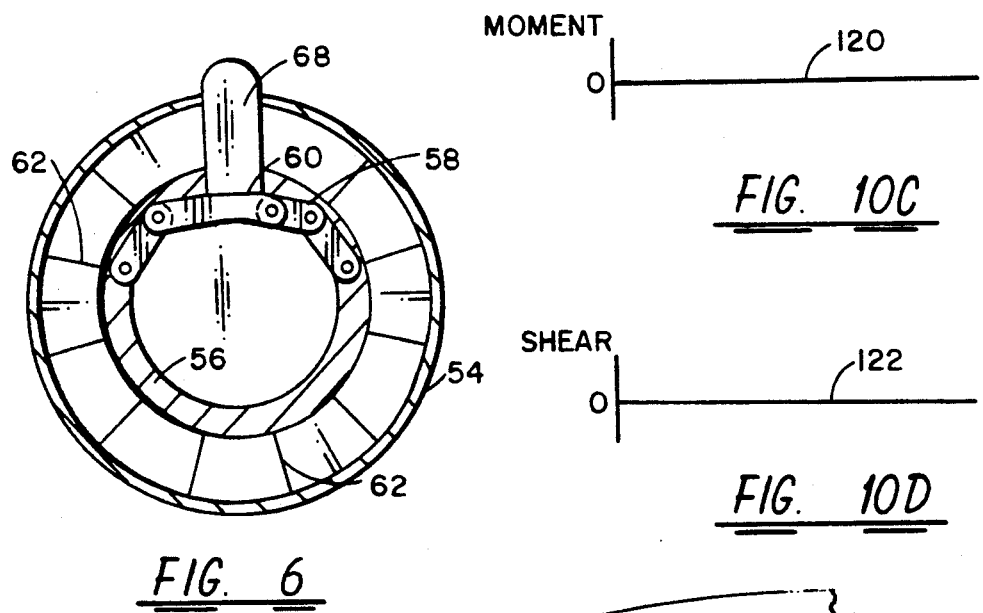
FIG. 10C
FIG. 10D
FIG. 6
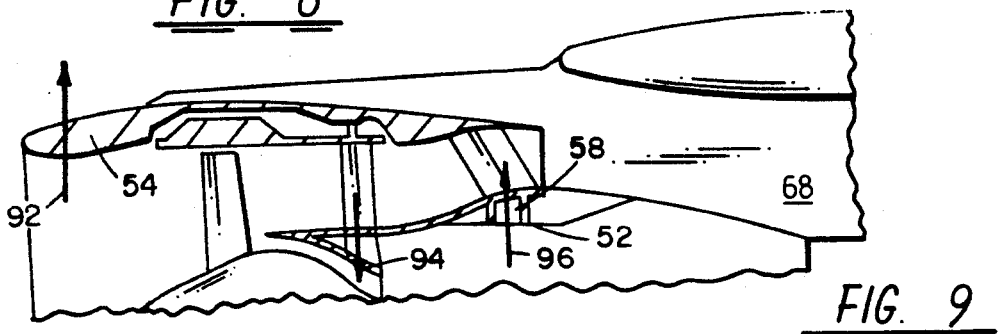
FIG. 9

STRUCTURE FOR ELIMINATING LIFT LOAD BENDING IN ENGINE CORE OF TURBOFAN

CROSS REFERENCE

Reference is made to a related co-pending application, herein incorporated by reference, entitled "Method and System for the Removal of Large Turbine Engines", filed Sep. 26, 1991, having U.S. patent application Ser. No. 07/765,797.

BACKGROUND OF THE INVENTION

The present invention relates to high bypass, turbofan engines and, more particularly, to a method and apparatus for supporting a turbofan engine such that a load path is provided which does not react through the engine core, thus preventing detrimental influences on engine performance.

In conventional turbofan and high bypass fan engines, a major performance penalty is attributed to clearance loss associated with inlet lift loads. Such loads occur from air flow entering the nacelle structure and reacting against the upper lip of the nacelle. This reaction tends to try to rotate the engine about the front mount. However, since the engine rear mount prevents such rotation, the reaction results in some degree of bending moment transmitted through the nacelle structure. Such nacelle bending can result in reduced clearance between the rotating elements of the core engine and the engine case.

For a better appreciation of this inlet lift loading phenomenon, reference is made to FIG. 1 which illustrates a conventional turbofan engine 10 comprised of front engine section 12, core engine section 14, and rear engine section 16. Front engine section 12 is comprised of nacelle 18 which extends from an air inlet region 20 to a rear nacelle region 22 located to the aft of fan outlet guide vanes (OGV's) 24. Fan OGV's 24 are located radially inward from nacelle 18 and connected thereto in a perpendicular manner. Fan blades 26 connected to rotor disk 28 are positioned forward of the fan OGV's 24 and are housed by fan casing 30. Fan casing 30 connects to and is located radially inward of nacelle 18. To the aft of fan OGV's 24 is located forward mount location 32 which comprises a position where an engine mount (not shown) attaches to the engine frame 149. The engine mount connects to the engine frame 149 on one side, then connects on its other side to a pylon (not shown) which is typically attached to an airplane wing (not shown). Located to the aft of forward mount location 32 and radially inward of engine cowling 34 are stators 36 which are located radially outward of high pressure rotors 38. Rotors 38 are connected to the core section of the engine 14 by means of shaft 40. The engine core section is comprised of high pressure compressor 42, combustion chamber 44, and high pressure turbines 40. The low pressure turbine 46 is located aft of core section 14 and drives fan rotor 28 through shaft 151. Rear mount location 48 is located aft of the low pressure turbine 46 and represents the location for support frame 150, similar to the support frame located at the forward mount location. The rear mount support frame is connected to a frame mount (not shown) which is similar to the frame mount located at the forward mount location. The rear frame mount connects to a rear location of the pylon (not shown). Thus, engine cowling 34 is connected to the pylon, the rear mount location 48, and the forward mount location 32.

Attention is now directed to FIG. 2 and rear mount location 48 and forward mount location 32. Lift force (lift load) $V_l$ acting along length $L_l$, which extends from a location forward of fan rotor blades 26 to fan OGV's 24, produces a large moment $M_R$ which is equal to the cross product of force $V_l$ and length $L_l$, i.e., $M_R = V_l \times L_l$. Force $V_l$ causes a reactive force $V_R$ at forward mount location 32. In addition to causing reactive force $V_R$, the lift load which produces moment $M_R$ results in force $V_m$ being applied to rear mount location 48. $L_E$ is the length from front mount location 32 to rear mount location 48. Therefore, $V_m \times L_E = M_R = V_l \times L_l$. The respective forces acting upon forward and rear mount locations 32 and 48 produce bending in the engine core, i.e., in high pressure (HP) compressor 42, HP turbines 47, and LP turbine 46. Core engine deflection line 50 of FIG. 3 illustrates this bending.

In the prior art turbine engine exemplified in FIGS. 1-3, the HP rotors do not bend between their supporting bearings (not shown); therefore, there is a net clearance closure (at engine top vertical) and a net clearance opening (at engine bottom vertical) between rotor and stator. The stator is ground large in the closure area so rubs do not occur; however, what does occur is performance loss during flight conditions as a result of excessive clearance. This situation is not alleviated by increasing the fan bypass ratio. As fan bypass ratio increases, the core engines are of course reduced in size relative to a fixed fan size and sensitivities to clearance closure are high. Also, since the core is made smaller, the stiffness of the core is less and deflections will be even greater. Further, spatial changes between the stator and rotor are caused by the inlet load and relative stiffness of the outer case, fan frame, and bearing supports.

SUMMARY OF THE INVENTION

Accordingly, one object of the present invention is to provide a structure for turbofan and high bypass fan engines of an aircraft which isolates the air inlet from the fan stator.

Another object of the present invention is to provide a load path so that the moment created by inlet lift is not reacted through the engine core.

Still another object of the present invention is to allow turbofan and high bypass fan aircraft engines to perform optimally throughout the course of their use.

These and other objects of the present invention are accomplished by an auxiliary frame mount connected to a support frame which is attachable to the floor of a pylon. The frame mount is attachable to the pylon at a position to the aft of front mount location above and remote to the engine core. As a result of the frame mount and frame support, the moment created by the inlet lift load is not reacted through the engine core.

The structure of the present invention isolates the moment created by inlet lift so as not to react through the backbone of the core engine. The moment is not eliminated but rather reacted through a separate mount/frame system connected directly to the pylon. The pylon experiences more localized load which is applied through a mount which is not affected by other conventional engine loads. The structure of the present invention isolates the fan case from the nacelle so that large nacelle excursions and deflections do not affect fan rotor clearance. The configuration does not comprise the removal of the core/booster assembly but rather enhances the system by utilizing an auxiliary support frame connected to an outer nacelle structure and pylon. Since the present invention allows for a housed OGV system, this makes it possible for the engine to have its own OGV/fan case when a new engine installation is needed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings in which:

FIG. 5, is a schematic side-view of the engine support structure of the present invention as depicted in FIG. 4 and further illustrates couple lengths $L_I$, $L_H$, and $L_E$;

FIG. 6 is a front cross-sectional schematic illustration taken along line A—A of FIG. 5.

FIG. 9 is a schematic diagram of the reactions on the forward mount and auxiliary mount (mid mount) according to the present invention caused by inlet lift;

FIG. 10C is a moment diagram depicting a moment of zero for the engine core of the turbine engine according to the present invention;

FIG. 10D is a shear diagram depicting zero shear in the engine core of the turbine engine according to the present invention;

When referring to the drawings, it should be understood that like reference numeral designate identical or corresponding parts throughout the respective figures.

DETAILED DESCRIPTION OF THE INVENTION

Figure 4:
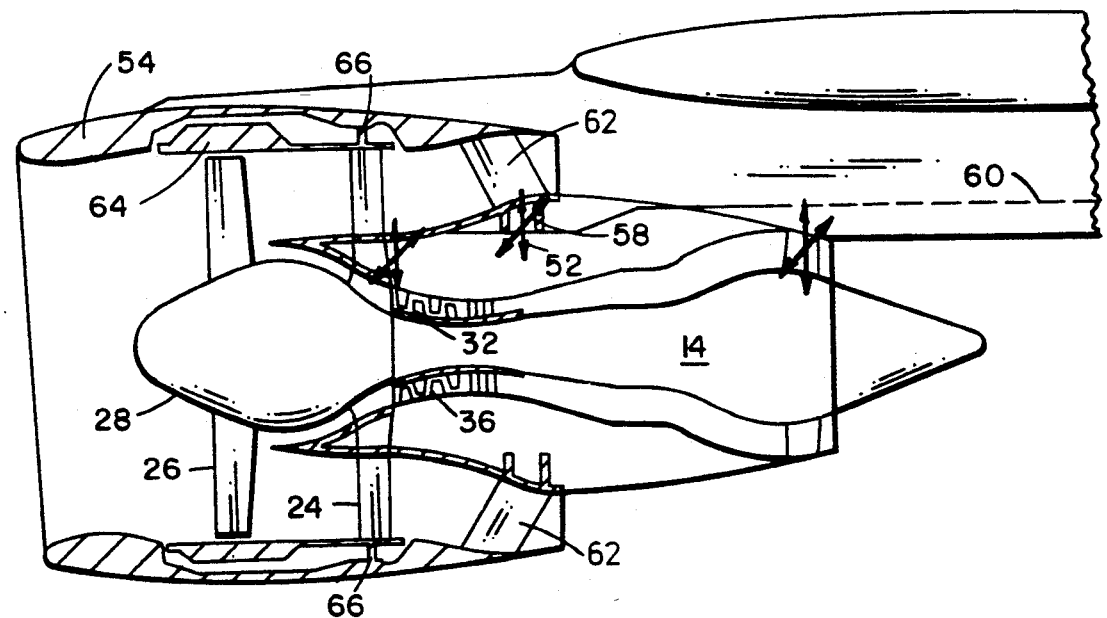
FIG. 4 is a schematic side-view of the engine support structure of the present invention.

With reference to FIG. 4, an auxiliary mount location 52, according to the present invention, has been added to the turbine engine assembly of FIGS. 13. In addition, outer nacelle 54 has replaced nacelle 18. Auxiliary frame support 56 is connected to frame mount 58 at auxiliary mount location 52. The frame mount 58 is connected to pylon floor 60. Auxiliary support frame 56 and frame mount 58 are similar to the support frames and frame mounts (which are not shown) located at the front and rear mount locations 32 and 48. The auxiliary mount location 52 is located to the aft of the forward mount location 32 above and remote to the engine core section 14. The auxiliary mount location is selected for the purpose of preventing the engine core section from experiencing bending caused by the moment created by the inlet lift load.

Auxiliary frame support 56 is connected to the end portion of outer nacelle 54 by means of struts 62 which shall be discussed subsequently in the commentary regarding FIG. 6. Located radially inward from outer nacelle 54 is isolated fan case 64. Isolated fan case 64 is connected to outer nacelle 54 by means of slip joint 66. Slip joint 66 is designed to take on radial load only. Fan OGV's 24 are connected to the end portion of isolated fan casing 66 at a location positioned radially inward from slip joint 66.

With reference to FIG. 5, lift load $V_I$ causes reaction force $V_R$ to act along forward mount location 32. However, since auxiliary frame mount location is located a distance $L_M$ from forward mount location 32, a moment equal to $V_R \times L_M$ is created. Since couple length $L_M$ is shorter than length $L_E$, the load experienced at auxiliary mount location 52 (FIG. 5) is greater than that experienced by rear mount location 48 (FIG. 2) for the same lift force $V_I$. It is again emphasized that by adding the auxiliary frame mount at auxiliary mount location 52, the moment created by the inlet lift load is reacted through the couple created between forward mount location and auxiliary mount location. Thus, the core section of the engine is left unaffected by the inlet lift load. Without the presence of auxiliary mount location 52, the influence of the couple created by lift load $V_I$ would be experienced by the entire length $L_E$ which extends from the forward mount location 32 to the rear mount location 48.

With reference to FIG. 6, which is a front view of the cross-section taken along line A—A of FIG. 5, the outer nacelle is circumferentially connected to auxiliary support frame by means of struts 62. Auxiliary support frame 56 is connected to frame mount 58 which is comprised of a vertical/side coat hanger arrangement.

Frame mount 58 is connected to the floor 60 of pylon 68.

The effects of the present invention on eliminating bending in the engine core are better appreciated by referring to moment and shear diagrams.

Figure 7A:
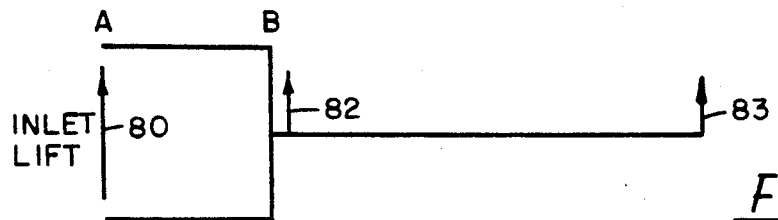
FIG. 7A is an inlet lift load diagram of a prior art turbine engine.
Figure 7B:
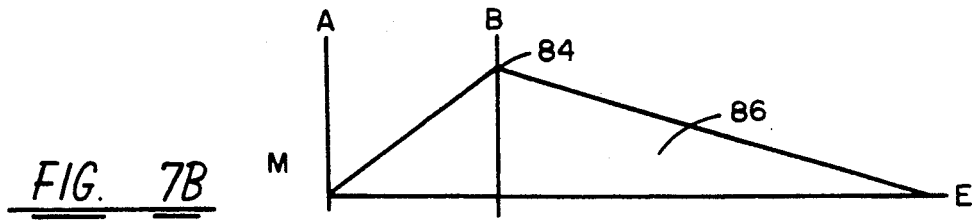
FIG. 7B is a moment distribution for the engine core of a prior art turbine engine.
Figure 7C:
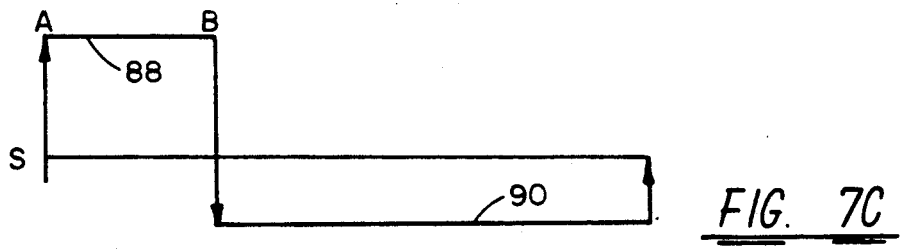
FIG. 7C is a shear diagram for a prior art turbine engine.
Figure 7D:
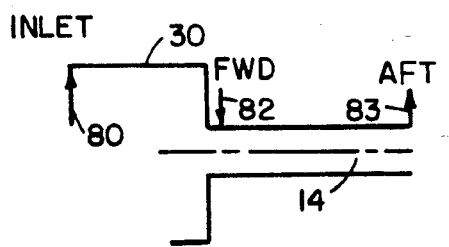
FIG. 7D is a graphical illustration which depicts how reactions to the inlet lift load cause bending in the engine core of a prior art engine.
Figure 7E:
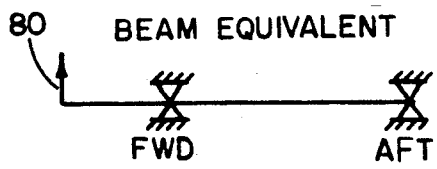
FIG. 7E is a graphical illustration representing the beam equivalent for the inlet lift load diagram of FIG. 7A.

FIG. 7A is a diagram illustrating the inlet lift represented by arrow 80 at the inlet of a typical prior art turbine engine with arrow 82 indicating the reaction at the forward mount of the engine and arrow 83 indicating the reaction at the aft mount location. FIG. 7B is a moment diagram for the prior art turbine engine of FIG. 7A. The greatest moment is indicated at point 84 Point 84 represents the moment at the forward mount location. Descending line 86 indicates the moment distribution in the core of the engine. FIG. 7C is a shear diagram for the prior art engine of FIG. 7B with line 88 indicating the shear from the air inlet to the forward mount location and line 90 indicating the shear from the forward mount location through the engine core. FIG. 7D clearly conveys that reaction 82 at the forward mount location (FWD) and reaction 83 at the aft mount location (AFT) cause bending in the engine core 14. FIG. 7E is the beam equivalent of FIG. 7A.

Figure 8A:
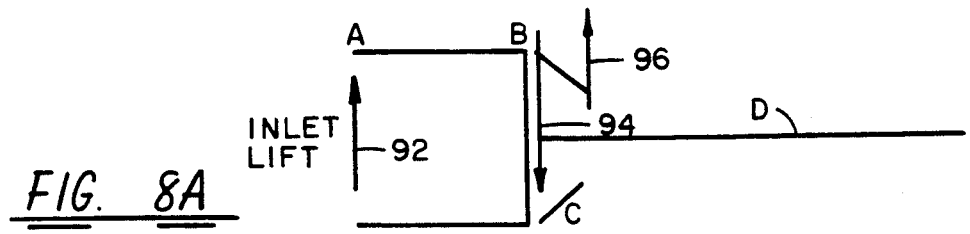
FIG. 8A is an inlet lift load diagram for a turbine engine according to the present invention.
Figure 8B:
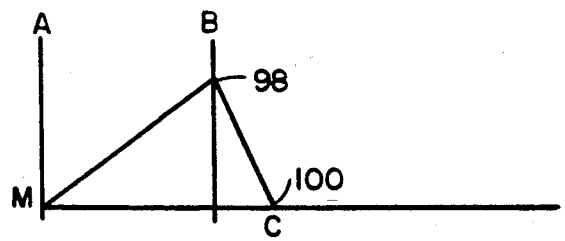
FIG. 8B is a moment diagram for a turbine engine according to the present invention which demonstrate that no moment is present in the engine core.
Figure 8C:
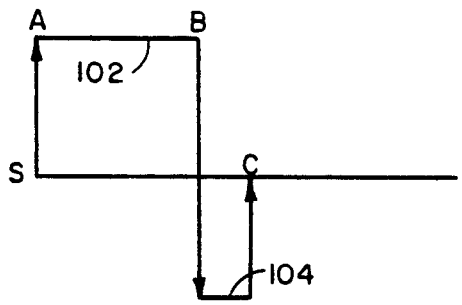
FIG. 8C is a shear diagram according to the present invention.
Figure 8D:
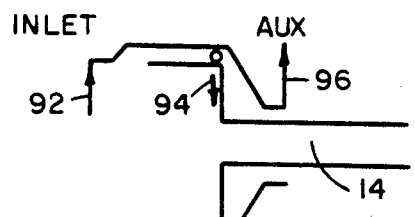
FIG. 8D is a graphical illustration which depicts how the present invention removes bending in the engine core.
Figure 8E:
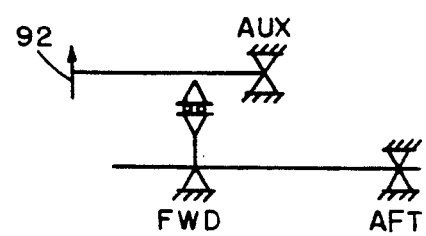
FIG. 8E is a graphical illustration representing the beam equivalent for the inlet lift load diagram of FIG. 8A.

The diagram of FIG. 8A shows the inlet lift 92 at the front of outer nacelle 54 of the present invention. The reaction at the forward mount is indicated by arrow 94 and the reaction at the auxiliary mount location 52 is indicated by arrow 96. The reactions are mathematically explained by the equation $V_{94} = V_{92} + V_{96}$. FIG. 8B is a moment diagram for the present invention and indicates that the maximum moment M occurs at the forward mount location indicated by 98 with the moment reducing to zero at the auxiliary mount location indicated at 100. This moment is bending the nacelle structure and not the core if the OGV reaction load $V_{94}$ is coplanar with the forward mount location 32. Thus no moment is present through the engine core. The shear diagram of FIG. 8C corresponds to the moment diagram of FIG. 8B with line 102 indicating the shear S from the air inlet at the front of the outer nacelle to the forward mount location. Line 104 indicates the shear from the forward mount location to the auxiliary mount location. Notice no shear is present to the aft of the auxiliary mount location. FIG. 8D clearly conveys that reactions 94 and 96 occur at the forward mount location (FWD) and the auxiliary or intermediate mount location (AUX) resulting in no moment being present through the engine core 14. FIG. 8E is the beam equivalent of FIG. 8A.

In FIG. 9, lift load 92 and reactions 94 and 96 (FIG. 8A) are indicated at the positions they occur on the forward region of the outer nacelle, the forward mount location and the auxiliary mount location of the present invention.

Figure 10A:
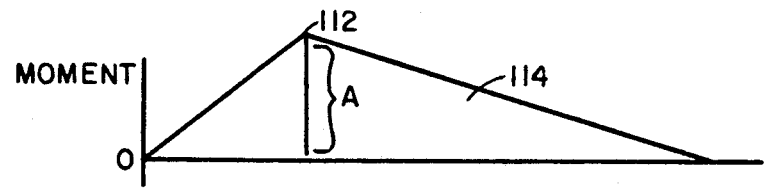
FIG. 10A is a moment diagram depicting the moment at the core engine inlet when the inlet of the core engine is co-planar with the forward engine mount in a prior art turbine engine.

In FIG. 10A, which is similar to FIG. 7B, a maximum moment indicated by 112 is located in the forward mount plane at the inlet to the engine core of a prior art engine. Descending line 114 indicates the moment through the engine core. In FIG. 10A the core engine inlet and OGV assembly are co-planar with the forward engine mount.

Figure 10B:
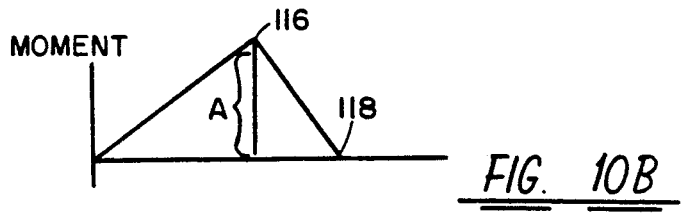
FIG. 10B depicts the moment existing at the nacelle plane in the turbine engine according to the present invention.

In FIG. 10B, which is similar to FIG. 8B, a moment diagram for the present invention shows a maximum moment indicated by 116. Maximum moment 116 occurs at the nacelle plane which is co-planar with the forward mount location. The moment decreases from the forward mount location to the auxiliary mount location with the auxiliary mount location experiencing a moment of zero as indicated at 118. The aircraft pylon structure used with the present invention must be capable of taking a large moment load generated from the shear force couple created by reactions at both forward and auxiliary mount planes.

In FIG. 10C, line 120 indicates a moment of zero through the engine core of the present invention and in FIG. 10D, line 122 indicates a shear of zero in the engine core of the present invention. In FIGS. 10A and 10B, the forward engine mount is in the plane of the OGV assembly according to one embodiment of the present invention. However, the auxiliary mount and nacelle structure of the present invention can be utilized when the OGV assembly is not co-planar with the forward engine mount.

Figure 11A:
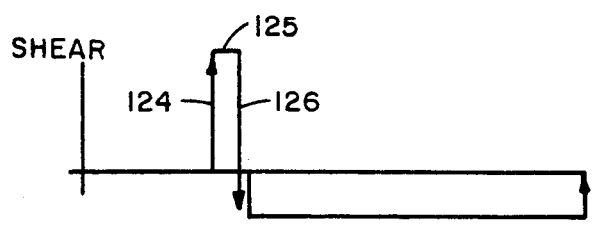
FIG. 11A is a shear diagram according to the present invention for an alternative embodiment when the OGV assembly is not co-planar with the forward engine mount.
Figure 11B:
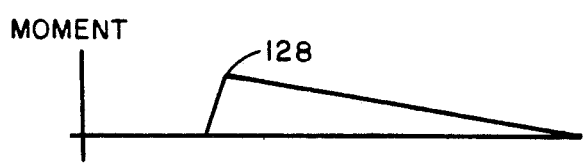
FIG. 11B is a moment diagram according to the present invention for the alternative embodiment of the present invention when the OGV assembly is not coplanar with the forward engine mount.

In FIG 11A, a shear diagram is shown for a turbine engine according to the present invention in which the OGV assembly is not co-planar with the forward engine mount. The reaction force at the OGV assembly indicated at 124 and the reaction force at the forward mount indicated at 126 produce a shear 125. In FIG. 11B the moment diagram which corresponds to the shear diagram of FIG. 11A has a peak moment indicated at 128 which occurs at the forward mount plane. The magnitude of this moment which is imposed on the core engine is a function of both distance from the aft mount to the OGV assembly and the distance from the forward mount to the OGV assembly.

In the present invention, the inlet lift generated moment is reacted through the nacelle outer structure via shearing reaction at the OGV support and bypass mid frame (auxiliary support frame). The fan containment and bypass case is isolated from the moment, and no moment is transmitted to the core of the engine. The mid mount bending at the auxiliary mount is not transferred to the engine core because a pivot point exists at the OGV attachment, i.e., slip joint 66.

The present invention allows the use of a high vane count OGV system. The weight of the mid bypass frame (i.e., auxiliary frame 56) is offset by the elimination of the conventional frames found in the prior art. In addition, the present invention allows for much tighter fan rotor tip clearance as a result of isolating inlet motion from rotor case motion. A flexible seal is required from rotor case to inlet aft inner lip. Bending in the engine core in prior art engines had an adverse effect on engine performance. The new mounting arrangement of the present invention has a beneficial effect on clearance which results in improved performance. Since high pressure turbomachinery such as high and ultra-high bypass fans are more sensitive to clearance considerations than low to medium bypass fans, the present invention will be particularly beneficial to the performance of high and ultra-high bypass fans.

Figure 1:
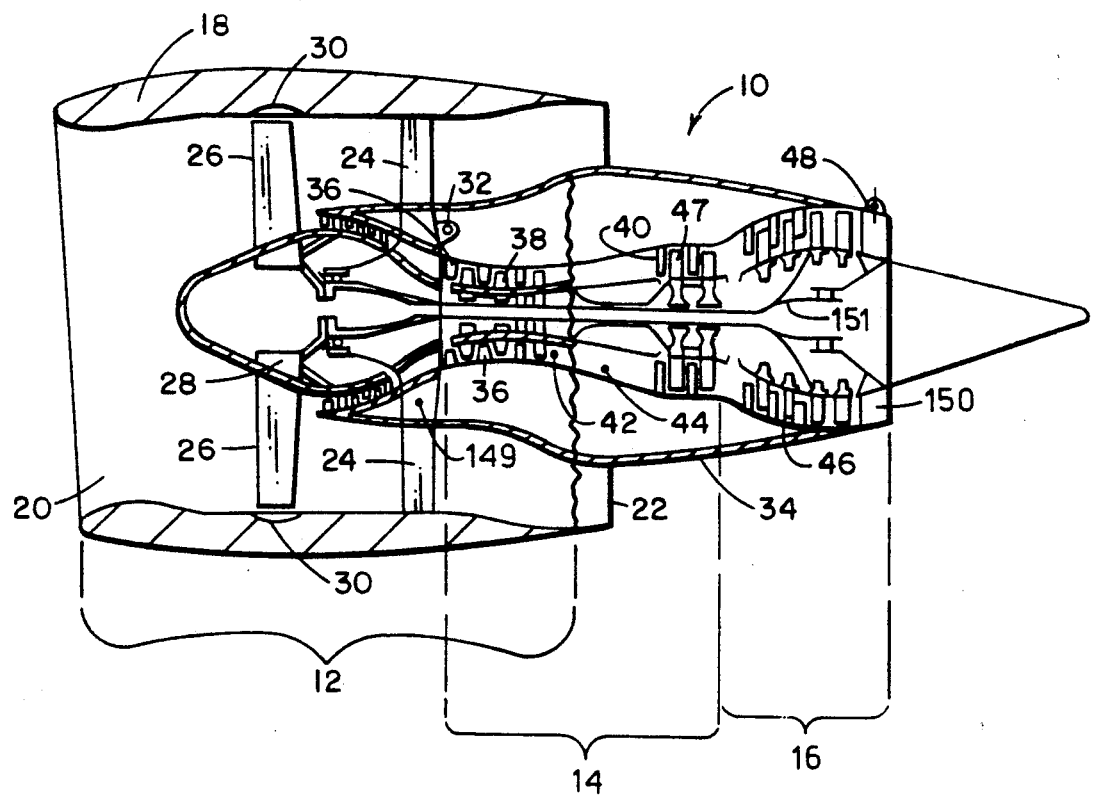
FIG. 1 is a schematic side-view of a prior art turbofan engine.
Figure 2:
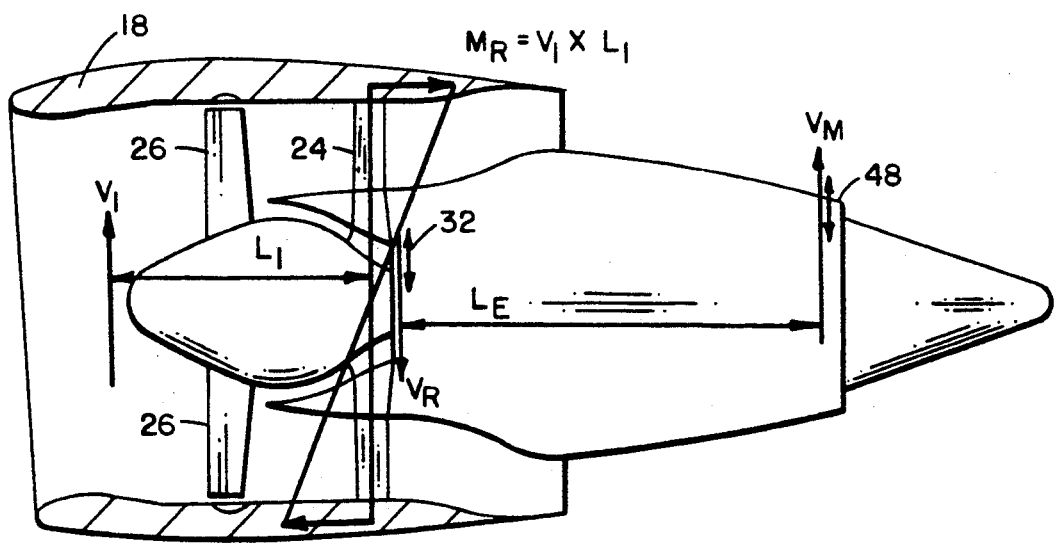
FIG. 2 is a schematic side-view of the prior art turbofan engine of FIG. 1 and serves to illustrate the forces and moment acting upon the engine.
Figure 3:
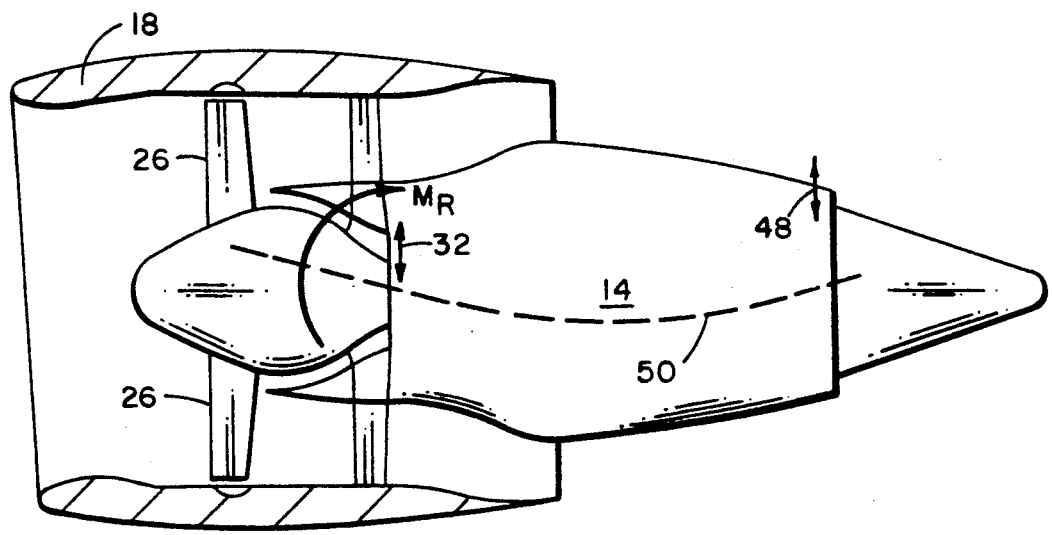
FIG. 3 is a schematic side-view of the prior art turbofan engine of FIG. I and serves to illustrate the core bending caused by the forces shown in FIG. 2.

The mounting arrangement of the present invention can be incorporated into the conventional turbofan engine of FIGS. 1–3 so that no changes in engine supports are necessitated.

The new frame and nacelle structure of the present invention would remain part of the aircraft support structure, not a part of the engine structure. It is assumed that the unbalanced moment created by the nacelle/OGV system of the present invention could support a large load through the section of pylon located at the 12 o'clock engine position. Fan casing roundness control is by the high number of radially stiff OGV's. The new frame (frame support) with vertical load accommodated through the new mount-to-pylon support (pylon 60 and frame mount 58) controls nacelle roundness.

Frame support can either be an integral part of the pylon or a bolted section. However, by making the frame support integral, significant savings in regard to weight could be realized.

The above detailed description is intended to be illustrative and non-limiting. Numerous changes and modifications are possible in light of the above teachings. It is, therefore, understood that the invention may be practiced otherwise than is specifically described herein and still be within the scope of the appended claims.

What is claimed is:

1. A mounting structure for securing a turbofan engine assembly to an aircraft, said turbofan engine assembly including an engine core section, said mounting structure comprising:

auxiliary mounting means for removing bending in the engine core section, said auxiliary mounting means being located between a forward mount location and a rear mount location, said auxiliary mounting means being located in a direction forward of the engine core section;

an outer nacelle connected to said auxiliary mounting means said auxiliary mounting means comprising a frame support; and an isolated fan case located radially inward of said outer nacelle and connected thereto by a slip-joint.

2. A mounting structure according to claim 1 wherein said auxiliary mounting means further comprises a frame mount connected to said frame support.

3. A mounting structure according to claim 2 wherein said auxiliary mounting means further comprises a pylon connected to said frame mount.

4. A mounting structure according to claim 1 further comprising:

a fan outlet guide vanes assembly connected to the distal end portion of said isolated fan casing.

5. A mounting structure according to claim 1 wherein:

said slip joint comprises a radial load path formed between said isolated fan case and said outer nacelle.

6. A mounting structure for coupling a gas turbine to an aircraft, the engine have a core section, a front engine section forward of the core section and a rear engine section aft of the core section, a housing enclosing the core section, rear section and at least a portion of the front section, the front section including a fan a nacelle and a fan casing structurally from said nacelle the aircraft having a pylon for supporting the engine, the structure comprising:

a first mounting means extending from the engine housing to the fan casing in a plane normal to an axis of the engine, said first mounting means being forward of the engine core section;

a second mounting means located aft of the engine core section for attaching the engine to said pylon;

a third mounting means coupled to about a midpoint of the engine core section radially outward and axially forward from said second mounting means, a plurality of structures extending to a connection point on the said nacelle axially aft of the an casing for attaching the engine to the aircraft pylon, said struts reacting bending movement on the nacelle through said third mounting means to the pylon.

7. The mounting structure of claim 6 and including a slip-joint for interconnecting the fan casing to the nacelle for isolating the fan casing from bending moments exerted on the nacelle.

* * * * *